US010310482B2

United States Patent
Shockley et al.

(10) Patent No.: US 10,310,482 B2
(45) Date of Patent: Jun. 4, 2019

(54) REFRIGERATION RACK MONITOR

(71) Applicant: Honeywell International Inc., Morris Plains, NJ (US)

(72) Inventors: Nicholas Shockley, Fayetteville, AR (US); Anthony Pishnery, North Royalton, OH (US)

(73) Assignee: Honeywell International Inc., Morris Plains, NJ (US)

( * ) Notice: Subject to any disclaimer, the term of this patent is extended or adjusted under 35 U.S.C. 154(b) by 370 days.

(21) Appl. No.: 15/211,674

(22) Filed: Jul. 15, 2016

(65) Prior Publication Data
US 2018/0017301 A1 Jan. 18, 2018

(51) Int. Cl.
*F25B 49/02* (2006.01)
*G05B 19/406* (2006.01)

(52) U.S. Cl.
CPC ............ *G05B 19/406* (2013.01); *F25B 49/02* (2013.01); *F25B 2339/047* (2013.01); *F25B 2341/0662* (2013.01); *F25B 2500/19* (2013.01); *F25B 2700/195* (2013.01); *F25B 2700/1933* (2013.01); *F25B 2700/21151* (2013.01); *G05B 2219/2654* (2013.01)

(58) Field of Classification Search
CPC .......... G05B 19/406; G05B 2219/2654; G05B 23/0218; G05B 23/0283; F25B 49/02; F25B 2339/047; F25B 2341/0662; F25B 2500/19; F25B 2700/1933; F25B 2700/195; F25B 2700/21151; F25B 45/00; F25B 2345/00; F24F 11/62
See application file for complete search history.

(56) References Cited

U.S. PATENT DOCUMENTS

| 7,594,407 B2 | 9/2009 | Singh et al. |
| 7,845,179 B2 | 12/2010 | Singh et al. |
| 8,130,112 B2 | 3/2012 | Gram-Hansen et al. |
| 2004/0050075 A1* | 3/2004 | King ..................... F25D 29/00 62/131 |
| 2007/0089437 A1 | 4/2007 | Singh et al. |
| 2009/0077983 A1* | 3/2009 | Singh .................... F25B 49/005 62/126 |
| 2012/0186274 A1* | 7/2012 | Cwiertniewicz ...... F25B 49/005 62/56 |

(Continued)

FOREIGN PATENT DOCUMENTS

WO 2013039911 A1 3/2013

*Primary Examiner* — Shahed Ahmed
(74) *Attorney, Agent, or Firm* — Seager, Tufte & Wickhem LLP

(57) ABSTRACT

Devices, methods, systems, and computer-readable media for a refrigeration rack monitor are described herein. One or more embodiments include a refrigeration system monitor, comprising a computing device with a memory storing instructions executable by a processor to: monitor real time performance metrics for a refrigeration system, wherein the real time performance metrics are received from temperature sensors, pressure sensors, and power sensors coupled to the refrigeration system, compare the real time performance metrics to a performance curve of devices associated with the refrigeration system, and generate health information for the devices associated with the refrigeration system based on the comparison.

20 Claims, 3 Drawing Sheets

(56) References Cited

U.S. PATENT DOCUMENTS

| | | | | |
|---|---|---|---|---|
| 2014/0139343 A1* | 5/2014 | Fisera | ............... | G08B 21/185 340/635 |
| 2014/0260342 A1* | 9/2014 | Pham | ............... | F25B 45/00 62/56 |
| 2018/0073789 A1* | 3/2018 | Connell | ............... | F25B 13/00 |
| 2018/0094829 A1* | 4/2018 | Wallace | ............ | G05B 23/0262 |

* cited by examiner

REFRIGERATION RACK MONITOR

TECHNICAL FIELD

The present disclosure relates to methods, devices, system, and computer-readable media for a refrigeration rack monitor.

BACKGROUND

A heat pump, such as, for instance, a residential or commercial refrigerator, freezer, or air conditioner, may use a vapor compression circuit to transport heat from a low temperature reservoir (e.g., outdoor air) to a high temperature reservoir (e.g., hydronic heating water). The vapor compression circuit may be designed and/or controlled in such a way as to transport the heat with the highest possible efficiency. The efficiency of the vapor compression circuit can be characterized by the ratio of the transported heat to the mechanical and/or electrical energy consumption (e.g., compressor electric power consumption) of the circuit, and this ratio can be denoted as the coefficient of performance for the heat pump.

The vapor compression circuit of a typical heat pump may include a liquid refrigerant receiver, which can be an accumulation vessel that holds (e.g., stores) excess liquid refrigerant present in the circuit. Holding the excess liquid refrigerant in the receiver can reduce the vapor compression circuit's sensitivity to the charge of the refrigerant (e.g., to changes in the charge of the refrigerant during operation of the circuit). Further, utilization of a liquid refrigerant receiver can simplify operation of the vapor compression circuit, and therefore simplify operation of the heat pump.

Compressors can be a vital part of the vapor compression circuit. Compressor failure can cause the vapor compression circuit to fail and/or cause a refrigeration system to fail. In some cases a compressor failure can cause high cost to fix quickly or can cause a high cost due to damage to products within the refrigeration system.

DETAILED DESCRIPTION

Figure 1:
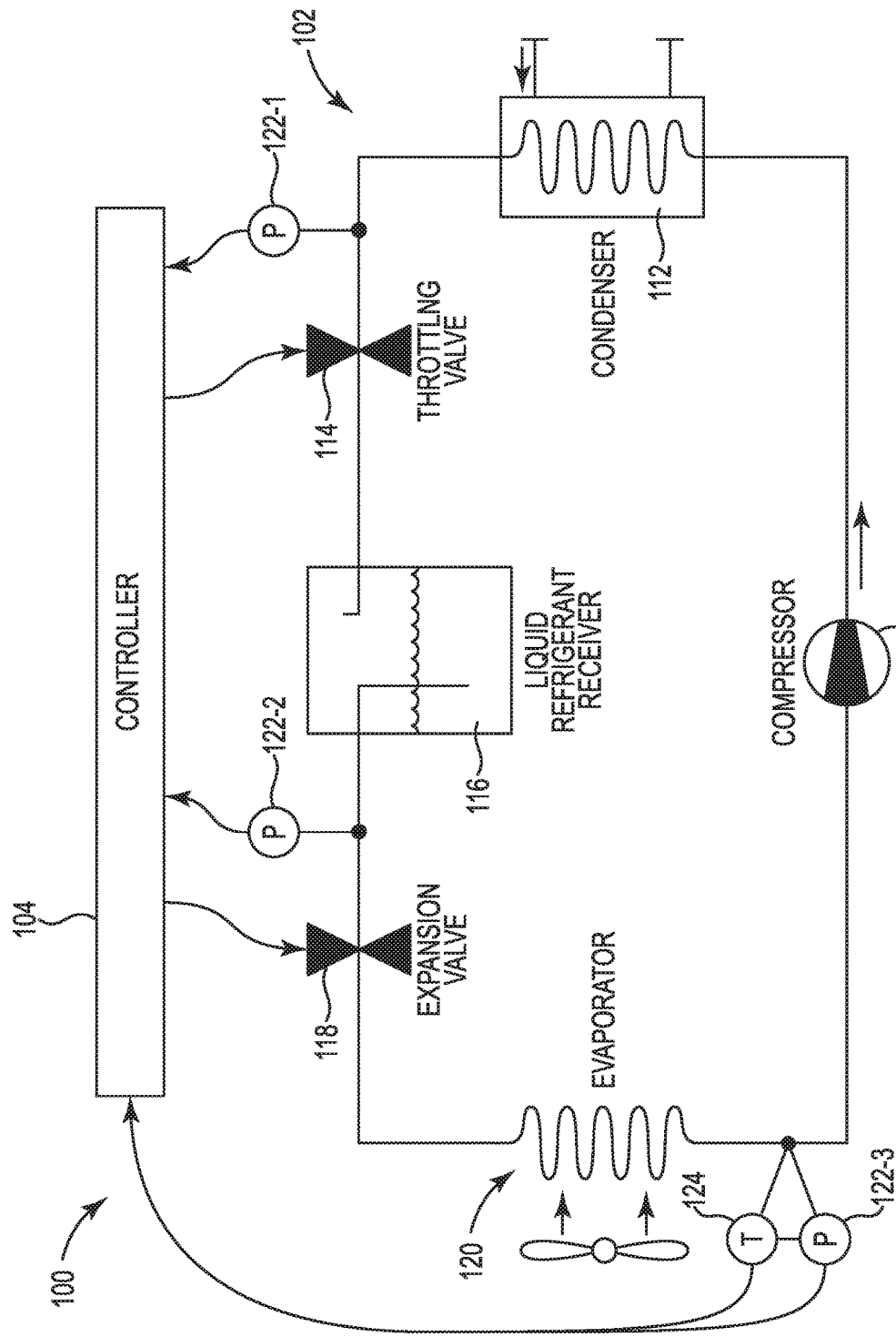
FIG. 1 is an example of a system for a refrigeration rack monitor consistent with the present disclosure.

Devices, methods, systems, and computer-readable media for a refrigeration rack monitor are described herein. As used herein, a refrigeration rack monitor includes devices, methods, systems, and computer-readable media for refrigeration system monitors. One or more embodiments include a refrigeration system monitor, comprising a computing device with a memory storing instructions executable by a processor to: monitor real time performance metrics for a refrigeration system, wherein the real time performance metrics are received from temperature sensors, pressure sensors, and power sensors coupled to the refrigeration system, compare the real time performance metrics to a performance curve of devices associated with the refrigeration system, and generate health information for the devices associated with the refrigeration system based on the comparison.

The refrigeration system monitor described herein can be utilized to monitor compressor performance of the refrigeration system and set a number of alarms or set points for a refrigeration system. In some examples, the refrigeration system monitor can be utilized to predict a failure of a compressor or other device within the refrigeration system before the compressor or other device actually fails or becomes non-functional. In some examples, the refrigeration system monitor can utilize real time data such as real time performance metrics of the refrigeration system. As used herein, the real time performance metrics can include real time data received from a plurality of sensors (e.g., temperature sensor, pressure sensors, power sensors, etc.). For example, the real time performance metrics can include temperature data, power consumption data for devices such as a compressor, pressure data, and/or other performance metrics associated with the refrigeration system.

In some examples, the refrigeration system monitor can compare the real time data to a performance curve. In some examples, the performance curve can include a manufacturer performance curve for a device (e.g., compressor, etc.) utilized in the refrigeration system. In some examples, the performance curve can include performance metrics of the refrigeration system and corresponding power consumption (e.g., power usage, etc.) of a device associated with the performance metrics. In some examples, the comparison can be utilized to generate health information for the devices within the refrigeration system. In some examples, the performance curve is an original equipment manufacturer (OEM) performance curve (e.g., manufacturer performance curve, etc.) for a compressor associated with the refrigeration system. In some examples, a controller can determine a manufacturer of the number of devices within a system. In some examples, the manufacturer can be determined based on embedded data within the controller.

In some examples, the comparison between the real time performance metrics (e.g., real time data associated with a performance of a device) and the performance curve can be utilized to generate a number of set points for a device and/or the refrigeration system. In some examples, the refrigeration system monitor can be utilized to generate a plurality of set points or alarms for each of the devices within the refrigeration rack system. For example, the refrigeration system monitor can generate a plurality of set points for a compressor of the refrigeration system. In some examples, the plurality of set points can be generated to identify relatively urgent alarms based on a deviation from the set point and also identify relatively prolonged alarms based on a particular deviation from the set point for a period of time. In this way, the refrigeration system monitor can identify devices within a refrigeration system that have a relatively higher potential of failure before there is an actual failure.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is an example of a system 100 for a refrigeration rack monitor consistent with the present disclosure. As shown in FIG. 1, the system 100 (e.g., refrigeration system, etc.) can include a vapor compression circuit 102 and a controller 104. Vapor compression circuit 102 can be part of a heat pump, such as, for instance, a residential or commercial refrigerator, freezer, or air conditioner. Controller 104 can be a microcontroller integrated into the heat pump, or controller 104 can be separate from the heat pump and communicate with vapor compression circuit 102 via a wired or wireless network, as will be further described herein.

As shown in FIG. 1, vapor compression circuit 102 can include a compressor 110, a condenser 112, a throttling valve 114, a liquid refrigerant receiver 116, an expansion valve 118, and an evaporator 120. Controller 104 can operate (e.g., control the operation of) throttling valve 114 and expansion valve 118, as will be further described herein.

A refrigerant can flow (e.g., circulate and/or cycle) through vapor compression circuit 102 in a counterclockwise direction, as indicated in FIG. 1. For example, the refrigerant can enter compressor 110 as a superheated vapor. Compressor 110 can compress the refrigerant to a higher pressure. The hot, compressed vapor can then flow (e.g., be routed) to condenser 112. That is, condenser 112 can be downstream from compressor 110 in vapor compression circuit 102, as illustrated in FIG. 1.

Condenser 112 can condense (e.g., cool) the refrigerant (e.g., superheated) vapor into a liquid. For example, condenser 112 can include a coil or tubes, and condenser 112 can condense the refrigerant vapor into a liquid by flowing the refrigerant through the coil or tubes while flowing cool water or cool air across the coil or tubes, such that heat from the refrigerant is carried away by the water or air.

The condensed liquid refrigerant can then flow through throttling valve 114 and be received by (e.g., input into) liquid refrigerant receiver 116. That is, throttling valve 114 can be located between condenser 112 and liquid refrigerant receiver 116 (e.g., downstream from condenser 112 and upstream from liquid refrigerant receiver 116), as illustrated in FIG. 1.

Liquid refrigerant receiver 116 can be a pressure accumulation vessel that holds (e.g., stores) excess liquid refrigerant present in vapor compression circuit 102. By holding the excess liquid refrigerant, receiver 116 can adjust (e.g., minimize) the active charge of the refrigerant, which can reduce the sensitivity of vapor compression circuit 102 to the refrigerant charge (e.g., to changes in the charge of the refrigerant during operation of the circuit).

Liquid refrigerant receiver 116 can include an upstream port through which the condensed liquid refrigerant enters (e.g., is input), and a downstream port through which the condensed liquid refrigerant exits (e.g., is output). The upstream port can have a nozzle to promote mixing and heat exchange of the input refrigerant within a vapor region, and the downstream port can have a pipe reaching to the bottom of a liquid region. During steady state operation of vapor compression circuit 102, if liquid refrigerant receiver 116 has some level of liquid refrigerant stored therein, then a vapor-liquid equilibrium can build up, and the downstream output of the receiver is always a saturated liquid. Further, if liquid refrigerant receiver 116 is isolated, the upstream input will also be a saturated liquid.

Before the condensed liquid refrigerant is received by (e.g., enters) liquid refrigerant receiver 116, throttling valve 114 can adjust (e.g., decrease) the pressure of the condensed liquid refrigerant to subcool (e.g., remove heat from) the condensed liquid refrigerant. That is, controller 104 can operate (e.g., adjust) throttling valve 114 to adjust the pressure of the condensed liquid refrigerant to subcool the condensed liquid refrigerant.

Throttling valve 114 can be any type of valve that can obstruct the flow of the condensed liquid refrigerant to adjust (e.g., decrease) its pressure. For example, throttling valve 114 can be a modulating electronic throttling valve. In some embodiments, throttling valve 114 can subcool the condensed liquid refrigerant by a particular (e.g., pre-determined) amount (e.g., a particular number of degrees). That is, throttling valve 114 can control the magnitude of the subcooling occurring in condenser 112. For instance, controller 104 can operate throttling valve 114 to adjust the pressure of the condensed liquid refrigerant by the amount needed to subcool the condensed liquid refrigerant by the particular amount. In some examples, the magnitude of the subcooling in the condenser 112 can be real time performance metrics as described herein.

The pressure adjustment (e.g., the magnitude of the pressure adjustment) made to the condensed liquid refrigerant by throttling valve 114 can be based (e.g., depend) on the pressure of the condensed liquid refrigerant before it flows through throttling valve 114 (e.g., the pressure of the condensed liquid refrigerant downstream from condenser 112 and upstream from throttling valve 114), and on the pressure of the condensed liquid refrigerant after it exits (e.g., downstream from) liquid refrigerant receiver 116. That is, the adjustment of throttling valve 114 made by controller 104 can be based on the pressure of the condensed liquid refrigerant before it flows through throttling valve 114 and after it exits liquid refrigerant receiver 116. For example, controller 104 can determine the adjustment to throttling valve 114 that will result in the pressure of the condensed liquid refrigerant being adjusted by the amount needed to subcool the condensed liquid refrigerant by the particular amount (e.g., the amount resulting in the greatest possible efficiency increase for vapor compression circuit 102) based on (e.g., using) the pressure of the condensed liquid refrigerant before it flows through throttling valve 114 and after it exits liquid refrigerant receiver 116, and adjust throttling valve 114 accordingly.

In some examples, the system 100 can include pressure sensors 122-1 and 122-2, as illustrated in FIG. 1. In some examples, the pressure sensors 122-1 and 122-2 can provide real time performance metrics as described herein. Pressure sensor 122-1 can sense the pressure of the condensed liquid refrigerant before its pressure is adjusted by throttling valve 114 (e.g., between condenser 112 and throttling valve 114), and pressure sensor 122-2 can sense the pressure of the condensed liquid refrigerant after it exits liquid refrigerant receiver 116 (e.g., between liquid refrigerant receiver 116 and expansion valve 118). Controller 104 can receive the sensed pressures from sensors 122-1 and 122-2, and adjust throttling valve 114 (e.g., operate throttling valve 114 to adjust the pressure of the condensed liquid refrigerant) as needed to subcool the condensed liquid refrigerant by the particular amount based on the received pressures.

Controller 104 can communicate with throttling valve 114 and pressure sensors 122-1 and 122-2 (e.g., control the operation of throttling valve 114 and receive sensed pressures from pressure sensors 122-1 and 122-2) via a direct (e.g., wired) connection (e.g., in embodiments in which controller 104 is integrated into the heat pump), or via a wired or wireless network or networks (e.g., in embodiments in which controller 104 is separate from the heat pump). The wireless network(s) can be, for instance, a wide area network (WAN) such as the Internet, a local area network (LAN), a personal area network (PAN), a campus area network (CAN), or metropolitan area network (MAN), among other types of wireless networks.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Although not shown in FIG. 1, in some embodiments, the system 100 can include a temperature sensor that can sense the temperature of the condensed liquid refrigerant before its pressure is adjusted by throttling valve 114 (e.g., between condenser 112 and throttling valve 114). In such embodiments, controller 104 can receive the sensed pressure from pressure sensor 122-1 and the sensed temperature from the temperature sensor, and adjust throttling valve 114 (e.g., operate throttling valve 114 to adjust the pressure of the condensed liquid refrigerant) as needed to subcool the condensed liquid refrigerant by the particular amount based on the sensed pressure and temperature.

Expansion valve 118 can adjust (e.g., further decrease) the pressure of the condensed liquid refrigerant. That is, expansion valve 118 can be operated by controller 104 (e.g., via a direct connection or a wired or wireless network(s)) to decrease the pressure of the subcooled liquid output from liquid refrigerant receiver 116. This decrease in pressure can be an abrupt pressure decrease that results in an adiabatic flash evaporation of part of the liquid refrigerant, which can lower the temperature of the refrigerant to a temperature that is lower than the temperature of the space to be cooled. In some examples, the pressure of the condensed liquid refrigerant can be real time performance metrics.

After flowing through the expansion valve 118, the liquid refrigerant can enter the coil or tubes of evaporator 120. A fan can circulate warm air from the enclosed space across the coil or tubes carrying the cold liquid refrigerant, which can cool the air and thus lower the temperature of an enclosed space (e.g., refrigeration system, etc.). At the same time, the warm air evaporates the liquid refrigerant, so that the refrigerant is once again a saturated vapor. The saturated vapor can exit evaporator 120 and flow to compressor 110, and the cycle can be repeated.

As shown in FIG. 1, the system 100 can include a pressure sensor 122-3 and a temperature sensor 124. Pressure sensor 122-3 and temperature sensor 124 can sense the pressure and temperature, respectively, of the saturated refrigerant vapor after it exits evaporator 120 (e.g., between evaporator 120 and condenser 110). Controller 104 can receive (e.g., via a direct connection or a wired or wireless network) the sensed pressure and temperature from sensors 122-3 and 124, and utilize the sensed pressure and temperature to control the superheating of the refrigerant vapor performed by compressor 110. For example, the controller 104 can utilize the sensed pressure and temperature as real time performance metrics for the system 100.

In some examples, the controller 104 can be utilized to monitor real time performance metrics for the system 100. For example, the controller can receive data from the number of sensors (e.g., pressure sensor 122-3, temperature sensor 124, etc.). In some examples, the controller 104 can also be utilized to monitor a power consumption for each of the number of electrical devices of the system 100. For example, the controller 104 can be utilized to monitor a power consumption (e.g., real time power usage, etc.) of the compressor 110. In some examples, the controller 104 can combine the sensor data (e.g., data from pressure sensor 122-1, 122-2, 122-3, data from temperature sensor 124, etc.) to generate real time performance metrics of the compressor 110 and/or the system 100.

In some examples, the real time performance metrics of the compressor 110 and/or the system 100 can include a load on the compressor 110 and/or system 100 with respect to a power consumption (e.g., quantity of Watts utilized per unit of time, etc.) of the compressor 110 and/or system 100. In some examples, the load on the compressor 110 and/or system 100 can be based on a temperature set point of the system 100, exterior factors of the system 100, and/or other factors that can affect the load or performance of the compressor 110 and/or the system. For example, the temperature setting of the system 100 can alter a load of the compressor 110 and/or the system 100. In this example, a relatively lower temperature setting can put a greater load on the compressor 110 and/or the system 100 to maintain the relatively lower temperature setting. In addition, relatively warmer exterior temperatures and other factors can put a greater load on the compressor 110 and/or the system 100 to maintain the temperature setting of the system 100.

In some examples, the real time performance metrics of the system 100 can include a graphical representation of sensor data (e.g., data received from sensors 122-1, 122-2, 122-3, 124, etc.), system 100 settings, and/or a power consumption of the compressor 110 and/or system 100. In some examples, the real time performance metrics of the system 100 can be compared to a performance curve of the corresponding devices and/or the system 100. As described herein, the performance curve of the corresponding devices and/or system 100 can be a manufacturer's performance curve for the corresponding devices and/or system 100.

In some examples, the real time performance metrics of the system 100 can be normalized with the performance curve. For example, the real time performance metrics can be altered such that a direct comparison of the real time performance metrics and the performance curve can be performed. In some examples, the controller 104 can normalize the real time performance metrics by converting the real time performance metrics to a power consumption with a corresponding load for each of the number of devices.

In some examples, the manufacturer's performance curve can include a predicted power consumption (e.g., kilowatts, etc.) of a device or system 100 with corresponding performance metrics of the device or system 100. For example, a manufacturer performance curve of the compressor 110 can include a predicted power consumption for the compressor 110 when the compressor 110 is under a particular load (e.g., temperature setting of the system, etc.) or performing particular performance metrics. For example, the manufacturer performance curve can include a particular temperature setting for the system 100 with a corresponding predicted power consumption of the compressor 110. In this way, the power consumption of the compressor 110 can be compared to the predicted power consumption from the manufacturer performance curve for the compressor 110 to generate health information for the compressor 110. In some examples, the controller 104 can be utilized to compare the real time performance metrics to the manufacturer's performance curve of particular devices within the system 100 and/or the overall system 100.

In some examples, the health information can include a health status for a particular device or system 100. For example, the controller 104 can generate health information for the compressor 110. In this example, the health information can be based on the comparison of the real time metrics corresponding to the compressor 110 and a performance curve of the compressor 110. In this example, the real time metrics can deviate from the performance curve. In this example, the health information can be based on the quantity of the deviation. For example, the health information can include a first health status when the quantity of deviation is within a first threshold value. In this example, the first health status can be a "healthy" status to indicate that the compressor 110 is performing within predicted power consumption for a corresponding load put on the compressor 110.

In some examples, the health information can include a second health status when the quantity of deviation is within a second threshold value. In this example, the second health status can be a "schedule maintenance" status. In some examples when the quantity of deviation is within the second threshold value, the quantity of deviation is outside the first threshold value. In some examples, additional or fewer health statuses can be added with corresponding threshold values based on the deviation determined by comparing the real time performance metrics to the performance curve. In some examples, the health information can indicate a probability of failure for devices associated with the refrigeration system.

In some examples, the health information generated by the controller 104 can be utilized to generate a number of set points (e.g., fault set points, etc.) for generating an alert or alarm corresponding to the system 100. For example, the performance curve can be utilized to generate a first set point that corresponds to a quantity of deviation between the real time performance metrics for a device and the performance curve for the device. In some examples, the first set point can be utilized by the controller 104 to trigger an alert only when the deviation passes a particular threshold value. That is, the first set point can be based on the quantity of the deviation. In some examples, the first set point can be based on the quantity of the deviation without consideration of the quantity of time of a deviation.

In some examples, the health information can be utilized to generate a second set point to trigger the controller 104 to initiate an alert for the system 100. In some examples, the controller 104 can generate a second set point that corresponds to a quantity of time for a deviation between the real time performance metrics for a device and the performance curve for the device. In some examples, the deviation of the second set point can be relatively less compared to the deviation associated with the first set point. In some examples, a relatively smaller deviation can indicate a fault or potential fault of a device when the relatively smaller deviation has occurred for a particular quantity of time. In these examples, the second set point can be utilized by the controller 104 to initiate an alert for a device or for the system 100 when the deviation exceeds the second threshold for the designated period of time. That is, the controller 104 can initiate an alert when the second deviation has occurred for a particular period of time.

In some examples, the controller 104 can generate a third set point to trigger an alert when the deviation is approaching the first set point at a particular rate (e.g., threshold rate, etc.). For example, the real time metrics can be changing in such a way where the deviation is increasing at a relatively fast rate. In this example, the rate of the deviation can exceed a threshold rate and can indicate that a device or the system 100 is about to fail or that a particular sensor has failed. Thus, the deviation may not exceed the first set point or the second set point, but the rate of change for the deviation may trigger the third set point.

In some examples, the controller 104 can compare the real time performance metrics to the performance curve of the devices associated with the refrigeration system to determine when the real time performance metrics have exceeded one or more of the generated set points (e.g., the first set point, the second set point, etc.).

Figure 2:
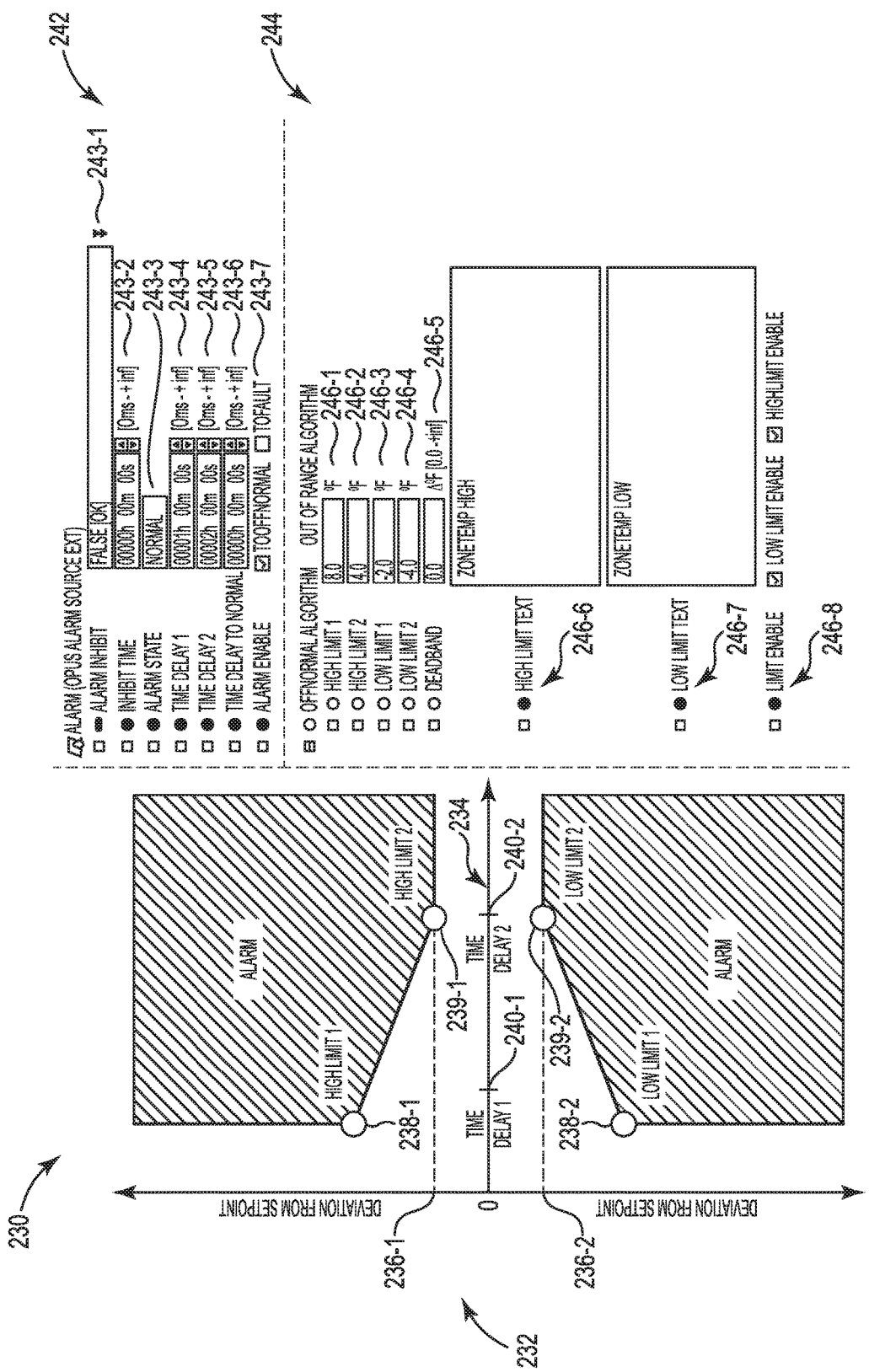
FIG. 2 is an example of a system for a refrigeration rack monitor consistent with the present disclosure.

FIG. 2 is an example of a system for a refrigeration rack monitor consistent with the present disclosure. In some examples, the system can be a display of a user interface associated with a controller of a refrigeration system. For example, the system can be a user interface associated with controller 104 of system 100 as referenced in FIG. 1. In some examples, the system can be utilized to configure set points for a controller to initiate alerts or alarms for a refrigeration system. In some examples, the set points can correspond to an alarm associated with at least one of: an operating envelope pressure breach, an operating envelope amps breach, a low system superheat, a lifetime run count, and/or a lifetime start count.

In some examples, a number of set points (e.g., first high limit 238-1, second high limit 239-1, first low limit 238-2, second low limit 239-2, etc.) can be generated by a controller via a user interface displaying a graphical representation 230. In some examples, the graphical representation 230 can include an x-axis 234 that can represent time (e.g., quantity of time since a deviation was detected, etc.). In some examples, the graphical representation 230 can include a y-axis 232 that can represent a deviation (e.g., deviation from a set point, deviation from a comparison as described herein, deviation from a predicted value, etc.). In some examples, a value of zero on the y-axis 232 can represent real time data (e.g., real time performance metrics, etc.) that are at a predicted value. In some examples, a negative value (e.g., lower than the value of zero) can represent real time data that is lower than the predicted value. In some examples, a positive value (e.g., greater than a value of zero) can represent real time data that is greater than the predicted value. That is, the graphical representation 230 can represent a deviation from a predicted value over a period of time.

In some examples, a first set point 238-1 can be generated at a first quantity of deviation that is a positive deviation from the predicted value. In some examples, the first set point 238-1 can be a deviation from a predicted value that has occurred for a first time interval 240-1. In some examples, the first time interval 240-1 can be relatively short quantity of time (e.g., 1-10 seconds, etc.) to account for unexpected spikes in the deviation that may not be related to an actual fault. That is, the first time interval 240-1 may not utilize the quantity of time to determine that there is a fault, but may utilize the quantity of time to determine that the potential fault is not a deviation caused by an unexpected spike from a particular sensor. In some examples, the first set point 238-1 can be a positive deviation. In these examples, a corresponding first set point 238-2 can be generated for negative deviations. In these examples, the corresponding first set point 238-2 can be utilized in a similar manner to the first set point 238-1.

In some examples, a second set point 239-1 can be generated at a second time interval 240-2. In some examples, the second set point 239-1 can correspond to a relatively smaller deviation compared to the first set point 238-1. For example, the deviation at 236-1 can be an acceptable deviation during regular operation of the system. However, at the second time interval 240-2, the deviation at 236-1 can indicate that a fault exists or has a great potential of occurring when the deviation occurs for the time interval 240-2. In some examples, the second set point 239-1 can be utilized to generate an alert when a deviation at 236-1 exists for a quantity of time at the second time interval 240-2.

In some examples, the second set point 239-1 can consider a quantity of time that a particular deviation (e.g., deviation at 236-1, etc.) has been monitored by a sensor coupled to a controller of the refrigeration system. That is, the first set point 238-1 can identify alerts based on the quantity of the deviation and the second set point 239-1 can identify alerts based on a quantity of time that a deviation has been monitored. In this way, the system can generate an alert or alarm for deviations that pass a threshold value as well as an alert or alarm for deviations that are below a threshold value for a particular quantity of time. In some examples, the second set point 239-1 can correspond to positive deviations from a predicted value. In some examples, the second set point 239-1 can have a corresponding second set point 239-2 that can correspond to negative deviations (e.g., negative deviation at 236-2, etc.) from the predicted value.

In some examples, the number of set points can include a third set point that can be based on a rate of real time performance metrics approaching the first set point 238-1, 238-2 or the second set point 239-1, 239-2. For example, the third set point can be based on how quickly the deviation occurs and/or how quickly the deviation exceeds a threshold value. In some examples, the third set point can be generated to identify when a device or system of the refrigeration system is rapidly failing and may need immediate service. For example, a sensor failure can cause the deviation of the real time performance metrics to rapidly change or deviate from the threshold value.

In some examples, the first set point 238-1, 238-2 can generate a first alarm type, the second set point 239-1, 239-2 can generate a second alarm type, and the third set point can generate a third alarm type. As described herein, each of the number of set points can indicate a different problem or fault associated with a device. Thus, a different alarm type can be generated for each of the number of set points to notify a user of the type of problem or fault associated with the device.

In some examples, the graphical representation 230 can be altered based on a number of inputs associated with user interface 242 and/or user interface 244. In some examples, the number of set points can be adjusted and/or changed to different set points by entering different inputs into the user interface 242 and/or the user interface 244. In some examples, the user interface 242 can include an alarm inhibit input 243-1. In some examples, the alarm inhibit input 243-1 can identify a reason why a particular alarm should be inhibited. For example, the alarm inhibit input 243-1 can describe that a particular alarm would be a false alarm. In some examples, the alarm inhibit input 243-1 can correspond to an inhibit time input 243-2. In some examples, the inhibit time input 243-2 can be a time interval (e.g., time interval 240-1, time interval 240-2, time between 0 and time interval 240-1, etc.).

In some examples, the user interface 242 can include an alarm state input 243-3. In some examples, the alarm state input 243-3 can be utilized to identify an alarm type for a particular set point. In some examples, the user interface 242 can include a first time delay input 243-4 and a second time delay input 243-5. In some examples, the first time delay input 243-4 and the second time delay input 243-5 can be utilized to generate the first time interval 240-1 and the second time interval 240-2 respectively.

In some examples, the user interface 242 can include a time delay to normal input 243-6. In some examples, the time delay to normal input 243-6 can be utilized to identify a quantity of time that the system will wait to determine if the system has normalized. In some examples, the time delay to normal input 243-6 can be utilized to restart the time delay for identifying a fault or alarm. That is, the time delay to normal input 243-6 can identify a quantity of time to wait before a fault is not identified and the time can restart at zero within the graphical representation 230. In some examples, the user interface 242 can include an alarm enable input to allow a user or controller to enable or disable a particular set point or alarm type.

In some examples, the user interface 244 can be utilized to generate a number of set points (e.g., set point 238-1 (high limit 1), set point 238-2 (low limit 1), set point 239-1 (high limit 2), set point 239-2 (low limit 2), etc.). In some examples, the user interface 244 can include a high limit 1 input 246-1, a high limit 2 input 246-2, a low limit 1 input 246-3, and a low limit 2 input 246-4 to set deviation values for the number of set points as described herein. In some examples, the user interface 244 can include a deadband input 246-5. In some examples, the deadband input 246-5 can be utilized to generate a set point corresponding to a rate of temperature change or rate of deviation change as described herein.

In some examples, the user interface 244 can include a high limit text input 246-6 and a low limit text input 246-7 to display input text when a high limit set point or low limit set point is exceeded as described herein. For example, when a high limit set point such as set point 238-1 is exceeded, the text from the high limit text input 246-6 can be displayed to a user. In this example, the high limit text input 246-6 can include a description of the alert type as described herein. In some examples, the user interface 244 can include a limit enable input 246-8. In some examples, the limit enable input 246-8 can be utilized to enable or disable the limit set within user interface 244.

Figure 3:
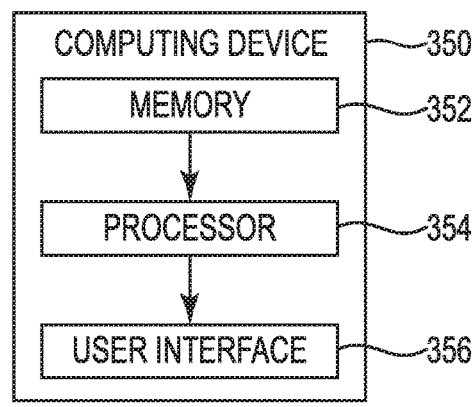
FIG. 3 is an example of a diagram of a computing device for a refrigeration rack monitor consistent with one or more embodiments of the present disclosure.

FIG. 3 is an example of a diagram of a computing device 350 for a refrigeration rack monitor consistent with one or more embodiments of the present disclosure. Computing device 350 can be, for example, an embedded system as described herein, among other types of computing devices. For example, the computing device 350 can be a controller (e.g., controller 104 as referenced in FIG. 1).

As shown in FIG. 3, computing device 350 includes a memory 352 and a processor 354 coupled to user interface 356. Memory 352 can be any type of storage medium that can be accessed by processor 354, which performs various examples of the present disclosure. For example, memory 352 can be a non-transitory computer readable medium having computer readable instructions (e.g., computer program instructions) stored thereon.

Processor 354 executes instructions to perform a number of functions in accordance with one or more embodiments of the present disclosure. Processor 354 can also format the alerts in form of LED signal, images, or compressed images for user viewing and transmission.

Further, although memory 352, processor 354 and user interface 356 are illustrated as being located in computing device 350, embodiments of the present disclosure are not so limited. For example, memory 352 can also be located internal to another computing resource (e.g., enabling computer readable instructions to be downloaded over the Internet or another wired or wireless connection). Part of the memory can be storage in a cloud storage. Processor 354 can be a cloud computer.

As shown in FIG. 3, computing device 350 can also include a user interface 356. User interface 356 can include, for example, a display (e.g., a screen, an LED light, etc.). The display can be, for instance, a touch-screen (e.g., the display can include touch-screen capabilities). User interface 356 (e.g., the display of user interface 356) can provide (e.g., display and/or present) information to a user of computing device 350.

Additionally, computing device 350 can receive information from the user of computing device 350 through an interaction with the user via user interface 356. For example, computing device 350 (e.g., the display of user interface 356) can receive input from the user via user interface 356. The user can enter the input into computing device 350 using, for instance, a mouse and/or keyboard associated with computing device 350, or by touching the display of user interface 356 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), field programmable gate arrays (FPGAs), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A refrigeration system, comprising:
a vapor compression circuit including:
   a compressor;
   a condenser that is downstream of the compressor;
   a throttling valve that is downstream of the condenser;
   a liquid refrigerant receiver that is downstream of the throttling valve;
   an expansion valve that is downstream of the liquid refrigerant receiver; and
   an evaporator that is downstream of the expansion valve and upstream of the compressor;
a first pressure sensor fluidly coupled with the vapor compression circuit at a position that is upstream of the throttling valve and downstream of the condenser;
a second pressure sensor fluidly coupled with the vapor compression circuit at a position that is upstream of the expansion valve and downstream of the liquid refrigerant receiver; and
a controller that is operably coupled with the first pressure sensor and the second pressure sensor, the controller being configured to receive real time performance metrics from the first pressure sensor and the second pressure sensor as well as power consumption data for the compressor;
the controller further configured to compare the real time performance metrics with a performance curve for the compressor and generate health information for the compressor based upon the comparison using at least some of the real time performance metrics; and
output an alert based on the generated health information.

2. The refrigeration system of claim 1, further comprising a third pressure sensor that is fluidly coupled with the vapor compression circuit at a position that is upstream of the compressor and downstream of the evaporator.

3. The refrigeration system of claim 1, further comprising a temperature sensor that is operably coupled with the vapor compression circuit at a position that is upstream of the compressor and downstream of the evaporator.

4. The refrigeration system of claim 1, wherein the performance curve is an original equipment manufacturer (OEM) performance curve for the compressor.

5. The refrigeration system of claim 1, wherein the health information indicates a probability of failure for the compressor.

6. The refrigeration system of claim 1, wherein the performance curve of the compressor includes power consumption of the compressor.

7. The refrigeration system of claim 6, wherein the real time performance metrics includes a real time load on the refrigeration system and a corresponding power consumption of the compressor.

8. The refrigeration system of claim 1, wherein the controller is further configured to generate a number of set points for the refrigeration system.

9. The refrigeration system of claim 8, wherein the number of set points are based on a deviation between a real time performance metric and the performance curve.

10. The refrigeration system of claim 9, wherein the number of set points are based on a quantity of time associated with the deviation between the real time metric and the performance curve.

11. A refrigeration system, comprising:
a vapor compression circuit comprising a compressor, a condenser, and an evaporator;
one or more pressure sensors each fluidly coupled with the vapor compression circuit at a different location;
one or more temperature sensors each thermally coupled with the vapor compression circuit at a different location; and
a controller configured to receive real time performance metrics from the one or more pressure sensors and the one or more temperature sensors, the controller further configured to:
generate a first set point that corresponds a quantity of deviation between the real time performance metrics and a performance curve of the compressor;
generate a second set point that corresponds to a quantity of time for a deviation between the real time performance metrics and the performance curve of the compressor;
compare the real time performance metrics to the performance curve of the compressor to determine when the real time performance metrics have exceeded one or more of the generated first and second set points; and
output a first alarm when the real time performance metrics have exceeded the first set point and output a second alarm when the real time performance metrics have exceeded the second set point.

12. The system of claim 11, wherein the controller is further configured to generate a third set point based on a rate of real time performance metrics approaching the first set point or the second set point.

13. The system of claim 11, wherein the real time performance metrics are converted to power consumption of the compressor.

14. The system of claim 11, wherein the performance curve of the compressor includes power consumption of the compressor for a number of corresponding loads for the compressor.

15. The system of claim 11, wherein the first set point or the second set point can correspond to an alarm, output by the controller, that is associated with at least one of:
an operating envelope pressure breach;
an operating envelope amps breach;
a low system superheat;
a lifetime run count; and
a lifetime start count.

16. The system of claim 11, wherein a first alarm type is generated by the controller when the first set point is exceeded and a second alarm type is generated by the controller when the second set point is exceeded.

17. A non-transitory computer readable medium having computer readable instructions stored thereon that are executable by a processor to:
determine a manufacturer of a compressor;
receive a manufacturer performance curve for the compressor based on the determined manufacturer of the compressor;
monitor real time performance metrics of the compressor including pressure readings upstream of a throttling valve and pressure readings upstream of an expansion valve;
normalize the real time performance metrics with the manufacturer performance curve;
generate health information for the compressor based on a comparison of the manufacturer performance curve and the normalized real time performance metrics; and
selectively output an alert based upon the generated health information.

18. The non-transitory computer readable medium of claim 17, wherein the controller is further configured to normalize the real time performance metrics by converting the real time performance metrics to a power consumption with a corresponding load for the compressor.

19. The non-transitory computer readable medium of claim 17, wherein the manufacturer performance curve predicts a power consumption of the number of devices for a corresponding load.

20. The non-transitory computer readable medium of claim 17, wherein the generated health information includes a number of set points based on at least one of:
a deviation between the normalized real time performance metrics and the manufacturer performance curve;
a quantity of time a deviation exists between the real time performance metrics and the manufacturer performance curve; and
a rate of real time performance metrics approaching a set point of the number of set points.

* * * * *